United States Patent [19]

Breault

[11] 4,414,291
[45] Nov. 8, 1983

[54] METHOD FOR REDUCING ELECTROLYTE LOSS FROM AN ELECTROCHEMICAL CELL

[75] Inventor: Richard D. Breault, Coventry, Conn.

[73] Assignee: United Technologies Corporation, Hartford, Conn.

[21] Appl. No.: 381,806

[22] Filed: May 25, 1982

Related U.S. Application Data

[62] Division of Ser. No. 219,609, Dec. 24, 1980, Pat. No. 4,345,008.

[51] Int. Cl.$^3$ .............................................. H01M 8/04
[52] U.S. Cl. ..................................... 429/14; 429/26; 429/34; 429/72; 429/120
[58] Field of Search ...................... 429/14, 26, 27, 29, 429/34, 46, 72, 120

[56] References Cited

U.S. PATENT DOCUMENTS 4,233,369  11/1980  Breault et al. ...................... 429/26

OTHER PUBLICATIONS

Chemical Engineer's Handbook, Fifth Edition, pp. 18-82, through 18-93, R. H. Perry & C. H. Chilton, McGraw-Hill.

Primary Examiner—Charles F. Lefevour
Attorney, Agent, or Firm—Stephen E. Revis

[57] ABSTRACT

In an electrochemical cell wherein during operation electrolyte evaporates into a reactant gas stream, the evaporated electrolyte, before it leaves the cell as a vapor in the reactant gas exhaust stream, is condensed from the gas stream by reducing the temperature of the reactant gas stream just before it exits the cell. The condensed electrolyte is taken up by the cell electrode and redistributed throughout the cell by diffusion and capillary action.

4 Claims, 2 Drawing Figures

4,414,291

METHOD FOR REDUCING ELECTROLYTE LOSS FROM AN ELECTROCHEMICAL CELL

This is a division of application Ser. No. 219,609 filed on Dec. 24, 1980, now U.S. Pat. No. 4,345,008.

DESCRIPTION

TECHNICAL FIELD

This invention relates to electrochemical cells, and more particularly to electrochemical cells whose electrolyte is liquid during operation.

BACKGROUND ART

It is known that in electrochemical cells which utilize phosphoric acid as the electrolyte there is some evaporation of the electrolyte into the reactant gas streams as they pass therethrough, particularly into the air (oxidant) stream which flows at a significantly greater rate than the hydrogen (fuel) stream. Although this evaporation is slight, it becomes significant over a long period of time and may eventually result in failure of the cell due to an insufficient quantity of electrolyte remaining within the cell. The problem becomes more severe as cell operating temperatures increase. Therefore, for extended periods of operation it may be required that this evaporated electrolyte either be replenished intermittently or continuously from a separate source, or the lost electrolyte must be recovered and returned to the cell. Even if electrolyte loss is sufficiently slow such that it would not have to be replaced during the design life of the cell, the phosphoric acid which leaves the cell in the reactant gas stream is highly corrosive and is preferably removed from the cell exhaust products before it does damage to components downstream of the cell. No commercially suitable solution to electrolyte evaporation problems has yet to be devised.

DISCLOSURE OF INVENTION

One object of the present invention is a method and apparatus for removing electrolyte vapor from an electrochemical cell reactant gas stream.

Another object of the present invention is a method and apparatus for reducing the loss of electrolyte from a cell caused by evaporation of the electrolyte into a reactant gas stream.

A further object of the present invention is a method and apparatus for reducing the amount of electrolyte leaving a cell as a vapor in a reactant gas stream.

Accordingly, in the method of the present invention electrolyte which has evaporated into a reactant gas stream during cell operation is condensed from the gas stream back into the electrode portion of the cell by cooling the reactant gas stream just before the gas stream leaves the cell. Capillary action and the electrolyte concentration gradient within the electrode results in redistribution of the electrolyte within the cell by bulk flow and/or diffusion within the electrode.

One preferred method for reducing the temperature of the reactant gas stream sufficiently to result in condensation of electrolyte vapor therein is to prevent the cell electrochemical reaction from occurring within the cell in a selected area (i.e., condensation zone) adjacent the reactant gas outlet. This may be done by not using a catalyst on that portion of the electrode within the condensation zone. The reactant gas temperature drops as it passes through this "inactive" portion of the cell. In a phosphoric acid electrolyte fuel cell, if the active portion of the cell is operating at about 400° F., and if the reactant gas pressure is about two atmospheres, the temperature of the cell within the condensation zone need only be about 375° F. to result in condensation of the electrolyte from the reactant gas stream back into the porous material of the electrode. The mere existence of an electrolyte concentration gradient between the inactive portion of the electrode in the condensation zone and the active portion of the electrode results in a continuous redistribution of the electrolyte by diffusion through the electrode during operation of the cell. There will also be redistribution of the electrolyte by bulk flow through the electrode as a result of capillary forces. It is contemplated that, in a preferred embodiment, the condensation zone portion of the electrode would be made with larger pores than the active portion of the electrode to enhance redistribution by bulk flow.

If eliminating the catalyst from the condensation zone portion of the electrode does not result in a sufficient reduction in the reactant gas temperature within a reasonable condensation zone length, additional cooling of that area of the cell may be accomplished by more conventional means. For example, stacks of fuel cells are presently cooled by passing a cooling fluid through the stack in channels or tubes which pass in-plane between a pair of adjacent cells such as is shown and described in commonly owned U.S. Pat. No. 4,233,369 Fuel Cell Cooler Assembly and Edge Seal Means Therefore, by R. D. Breault, R. J. Roethlein and J. V. Congdon. The density of the coolant carrying channels or tubes (and thus the coolant flow rate) may be increased adjacent that area of the cells where condensation is desired so as to lower the cell temperature in that particular area relative to the remainder of the cell.

Since condensed electrolyte droplets need a surface to attach themselves to within the cell if they are not to be swept out of the cell along with the reactant gas, condensation may be further aided by forcing the reactant gas stream to pass through a portion of the electrode material disposed within the condensation zone, as opposed to simply having an open reactant gas carrying channel extending through the zone.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
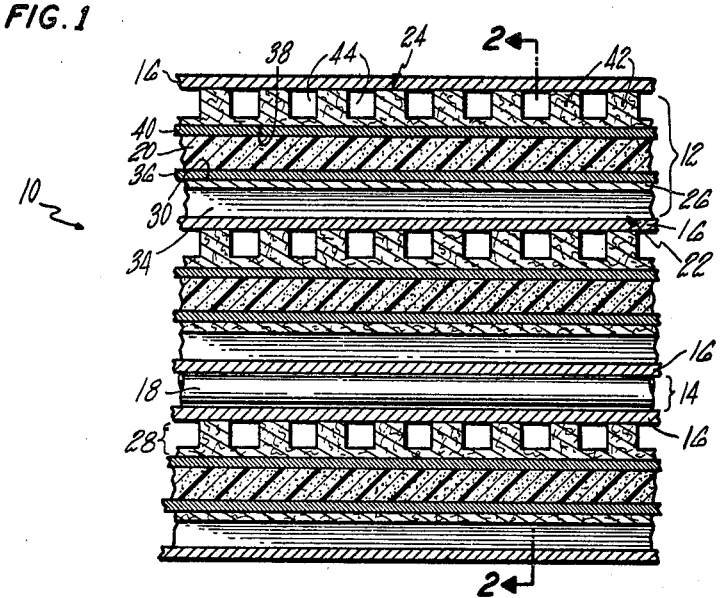
FIG. 1 is a cross section of a portion of a fuel cell stack and is not scale.

FIG. 1 is a cross-sectional view of part of a fuel cell stack 10 made up to fuel cells 12, coolant holder assemblies 14, and gas impervious separator plates 16. A separator plate 16 is disposed between adjacent fuel cells 12 as well as being disposed on either side of the coolant holders 14. The stack components are arranged relative to each other in a manner quite similar to the stack described in commonly owned U.S. Pat. No. 4,233,369, which is incorporated herein by reference. Thus, the stack is comprised of several adjacent fuel cells followed by a coolant holder assembly, followed by another group of fuel cells, and then another coolant holder assembly, and so forth. A holder layer 15 of the coolant holder assembly carries a plurality of tubes 18 which pass in-plane therethrough and which carry coolant through the stack to withdraw the heat generated by the electrochemical reaction within the cells during operation. Each cell 12 includes a thin electrolyte retaining matrix layer 20 having an anode or fuel electrode 22 disposed on one side thereof and a cathode or oxidant electrode 24 disposed on the other side thereof. In this embodiment phosphoric acid is the electrolyte; and the matrix layer 20 between the anode and cathode electrodes is a five mil thick layer of silicon carbide with a binder such as polytetrafluoroethylene as described in commonly owned U.S. Pat. No. 4,017,664.

The anode and cathode electrodes are of the well known gas diffusion type and each comprises a fibrous gas porous carbon substrate 26, 28, respectively, which may be made in any manner known in the art, such as according to the teachings of commonly owned U.S. Pat. Nos. 4,115,627 or 4,035,551. The anode substrate 26 includes a flat surface 30 which faces the matrix layer 20, and has a plurality of parallel ribs 32 (FIG. 2) on the opposite surface. The ribs 32, in combination with the separator plates 16, define parallel channels 34 therebetween which extend completely across the cell interconnecting a fuel inlet manifold (not shown) on one side of the stack with a fuel outlet manifold (not shown) on the other side thereof. In FIG. 1 the channels 34 run parallel to the plane of the paper, as do the coolant carrying tubes 18 within the coolant holder assembly 14. On the flat surface 30 of the anode substrate 26 is disposed a thin layer of catalsyt 36. The catalyst 36. The catalyst layer preferably has a thickness on the order of two to five mils, while the overall electrode thickness may be on the order of one-tenth inch.

The cathode electrodes 24 are similar in construction to the anode electrodes 22. Thus, on the flat surface 38 of the cathode substrate 28, which faces the matrix layer 20, is a thin layer 40 of catalyst; and, on the opposite side of the cathode substrate 28 are ribs 42 which define channels 44 for carrying the oxidant (air in this case) across the cells in a direction perpendicular to the fuel flow across the anode electrodes 22. One difference between the anode and cathode electrodes is that in the cathode electrodes the channels extend from an oxidant inlet manifold (not shown) on one side of the stack to a point short of the oxidant exhaust manifold 46 on the other side of the stack, as best seen in FIG. 2.

Figure 2:
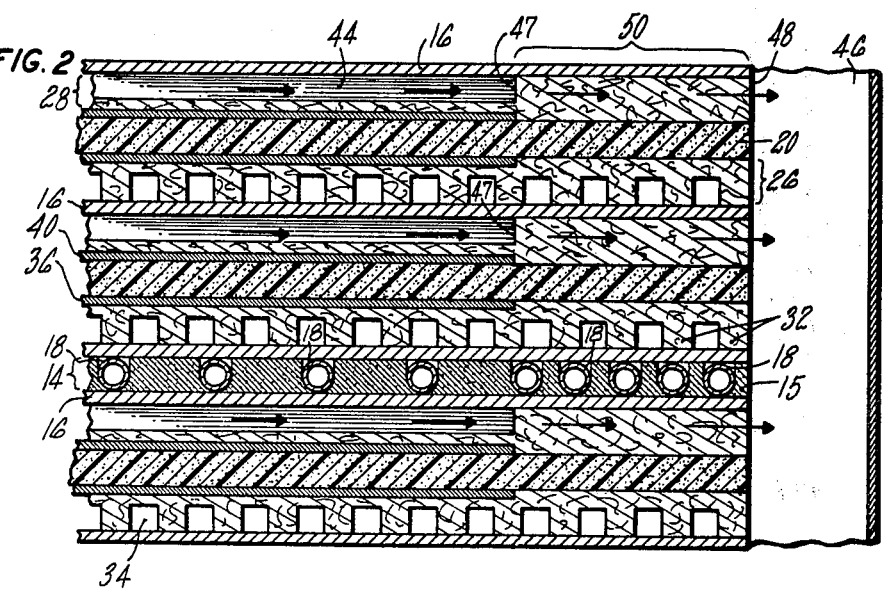
FIG. 2 is a sectional view taken along the line 2—2 of FIG. 1.

As also best seen in FIG. 2, the catalyst layers 36, 40 of both the anode and cathode electrodes also terminate short of the oxidant outlet side 48 of the stack 10. In this embodiment the fibrous, porous material of the cathode electrode substrate 28 fills the space between the electrolyte matrix 20 and the separator plate 16 and between the ends 47 of the channels 44 and the oxidant gas outlet side 48 of the stack. Thus, the oxidant gas must pass through a thickness of porous electrode material just prior to its leaving the cell. This filled portion of each cell, which is an electrochemically inactive portion of the cell in view of the lack of catalyst, is called the condensation zone 50, and is cooler than the active or catalyst containing portion of the cell. Further cooling of the condensation by increased coolant tube density (relative to the electrochemically active portion of the stack) parallel to and adjacent the outlet side 48 of the stack.

During operation of the stack 10 a fuel such as hydrogen gas passes across the anode electrode 22 through the channels 34 and comes into contact with the catalyst layer 36 and the phosphoric acid within the matrix 20 through the open porses in the material of the anode electrode substrate 26. Simultaneously, but in a direction perpendicular thereto, air as the oxidant enters the channels 44 from a manifold on one side of the stack 10 and travels across the cathode electrode 24 and into contact with the catalyst layer 38 and the electrolyte within the matrix 20 via the open pores in the cathode electrode substrate 28. Electricity, heat, and water are produced by the electrochemical reaction in the cells, as is well known in the art.

Although the vapor pressure of phosphoric acid in art at operating temperatures on the order of about 400° F. is very low, some small quantity of phosphoric acid evaporates into both the flowing air and hydrogen streams as they travel through the cells. As the air stream passes through the condensation zone 50 at the ends 47 of the channels 44 its temperature begins to drop for two major reasons: (1) the lack of an electrochemical reaction in the condensation zone, and (2) a greater amount of cooling fluid per square inch of cell is flowing in proximity to the condensation zone 50 in the tubes 18 than is flowing in proximity to the active portions of the cells.

Cooling of the air stream is also enhanced in the condensation zone by the increased rate of heat transfer between the air and the cathode electrode substrate 28 as a result of the air having to travel through the pores of the substrate within the condensation zone 50. A significant portion of the electrolyte which has evaporated into the air stream over the active portions of the cells condenses onto the electrode substrate pore surfaces as the air passes therethrough. This increases the concentration of electrolyte in that portion of the electrode substrate within the condensation zone, resulting in movement of the condensed-out electrolyte into that portion of the substrate over the catalyst layer 40 in the active portion of the electrode.

Additional redistribution of the electrolyte back over the active portion of the cells may be accomplished by manufacturing the condensation zone portion of the electrode substrate with larger pores than the active portion of the electrode substrate. The difference in pore size will result in bulk flow from the condensation portion into the active portion due to capillary forces. The larger pores also reduce pressure losses through the condensation zone.

It is believed that significant condensation and redistribution of evaporated electrolyte can be accomplished with a condensation zone comprising only 5–10 percent of a cell's volume.

In this preferred embodiment three distinct steps have been taken to condense the evaporated electrolyte back into the electrode before the reactant gas stream leaves the cell. There are: (1) removal of the catalyst from the condensation zone to prevent the electrochemical reaction from taking place therein, thereby resulting in less heat generation in the condensation zone as compared to the active portions of the cells; (2) increased conventional stack cooling in the proximity of the condensation zone; and (3) blocking the airflow channels with gas porous electrode substrate material within the condensation zone to force the air to pass through the electrode material and come into contact with a much greater surface area of the electrode which increases heat transfer and enhances condensation. It may be that one or more of the foregoing steps need not be taken in order to accomplish the required amount of condensation for a particular application or cell construction. Furthermore, in this embodiment emphasis is placed on condensing electrolyte from the air stream. Similar steps might be taken on the adjacent side of the cell where the hydrogen stream exits the stack; however, since the air stream probably picks up an order of magnitude more electrolyte vapor than the hydrogen stream, this is not likely to be necessary.

Although the invention has been shown and described with respect to preferred embodiments thereof, it should be understood by those skilled in the art that other various changes and omissions in the form and detail thereof may be made therein without departing from the spirit and the scope of the invention.

I claim:

1. In a stack of electrochemical cells, each cell having electrolyte adjacent a gas diffusion type porous electrode wherein during operation said electrolyte evaporates into a reactant gas stream flowing through said cell in operable relationship to said electrode and to said electrolyte, the process of reducing electrolyte loss from said cells as a result of said evaporation comprising the step of cooling said gas stream in a condensation zone within each cell adjacent the reactant gas outlet of each cell so as to condense at lesat some of the electrolyte vapor from the gas stream back into the respective electrode of each cell prior to said gas stream leaving the cell, wherein said condensed-out electrolyte is redistributed within the cell by diffusion or bulk flow within the electrode.

2. The process according to claim 1 wherein said step of cooling includes reducing the amount of heat generated by a cell in the condensation zone by preventing the cell electrochemical reaction from occurring in that zone.

3. The process according to claim 2 wherein said step of cooling includes passing all of said reactant gas stream through the pores of a portion of said porous electrode disposed in said condensation zone.

4. The process according to claims 1, 2 or 3 wherein the electrolyte is phosphoric acid and said electrolyte is disposed within a matrix element.

* * * * *

UNITED STATES PATENT AND TRADEMARK OFFICE
CERTIFICATE OF CORRECTION

PATENT NO. : 4,414,291

DATED : November 8, 1983

INVENTOR(S) : Richard D. Breault

It is certified that error appears in the above-identified patent and that said Letters Patent is hereby corrected as shown below:

Column 2, line 53 "not scale" should be --not to scale--.

Column 2, line 60 "to" should be --of--

Column 3, line 34 "catalsyt" should be --catalyst-- after "catalyst 36." cancel "The catalyst 36."

Column 3, line 65 after "condensation" insert --zones 50 is accomplished--

Column 4, line 5 "porses" should be --pores--

Column 4, line 16 "art" should be --air--

Column 4, line 58 "There" should be --These--

UNITED STATES PATENT AND TRADEMARK OFFICE
CERTIFICATE OF CORRECTION

PATENT NO. : 4,414,291           Page 2 of 2

DATED : November 8, 1983

INVENTOR(S) : Richard D. Breault

It is certified that error appears in the above-identified patent and that said Letters Patent is hereby corrected as shown below:

Column 6, line 5 "lesat" should be --least--

Signed and Sealed this

Twenty-fourth Day of July 1984

[SEAL]

Attest:

GERALD J. MOSSINGHOFF

Attesting Officer    Commissioner of Patents and Trademarks